US012641701B2

(12) United States Patent

Powell et al.

(10) Patent No.: US 12,641,701 B2

(45) Date of Patent: May 26, 2026

(54) LAMP MONITORING AND CONTROL SYSTEM AND METHOD

(71) Applicant: SmartCap Innovations, LLC, West Hartford, CT (US)

(72) Inventors: Rodney O. Powell, West Hartford, CT (US); Claudio Borea, West Hartford, CT (US)

(73) Assignee: SMARTCAP INNOVATIONS, LLC, West Hartford, CT (US)

( * ) Notice: Subject to any disclaimer, the term of this patent is extended or adjusted under 35 U.S.C. 154(b) by 247 days.

(21) Appl. No.: 18/205,993

(22) Filed: Jun. 5, 2023

(65) Prior Publication Data

US 2023/0397318 A1 Dec. 7, 2023

Related U.S. Application Data

(60) Provisional application No. 63/349,435, filed on Jun. 6, 2022.

(51) Int. Cl.

| | |
|---|---|
| ***H05B 47/19*** | (2020.01) |
| ***F21V 23/00*** | (2015.01) |
| ***H01J 61/20*** | (2006.01) |
| ***H01J 61/82*** | (2006.01) |
| ***H05B 47/175*** | (2020.01) |
| ***H05B 47/20*** | (2020.01) |
| *F21S 8/08* | (2006.01) |

(52) U.S. Cl.

CPC .............. *H05B 47/19* (2020.01); *H01J 61/20* (2013.01); *H01J 61/822* (2013.01); *H05B 47/196* (2024.01); *H05B 47/20* (2020.01); *F21S 8/085* (2013.01)

(58) Field of Classification Search

CPC ...... H05B 47/00; H05B 47/19; H05B 47/196; H05B 47/20; H05B 47/22; H05B 47/125; H05B 47/13; F21V 23/00; F21V 23/0464; F21V 23/047

See application file for complete search history.

(56) References Cited

U.S. PATENT DOCUMENTS

| | | | |
|---|---|---|---|
| 3,584,222 | A | 6/1971 | Nesbitt |
| 3,727,063 | A | 4/1973 | Turner |
| 3,828,334 | A | 8/1974 | Wallace |
| 3,900,763 | A | 8/1975 | Turney |
| 4,008,415 | A | 2/1977 | De Avila-Serafin et al. |
| 4,406,995 | A | 9/1983 | May |
| 4,479,246 | A | 10/1984 | Young |
| 4,580,099 | A | 4/1986 | Zetti |
| 4,614,945 | A | 9/1986 | Brunius et al. |

(Continued)

FOREIGN PATENT DOCUMENTS

| | | | |
|---|---|---|---|
| EP | 0 470 943 | | 2/1992 |
| GB | 2 176 640 | A | 12/1986 |

(Continued)

*Primary Examiner* — Thai Pham

(74) *Attorney, Agent, or Firm* — Foley & Lardner LLP

(57) ABSTRACT

A system and method monitors a lamp assembly. Image data related to an object of interest is captured with an optical sensor disposed near the object of interest related to the lamp assembly. The image data from the optical sensor is provided to a processing circuit of a lamp monitoring and control device. The image data from the processing circuit can be transmitted to a base station using a transmit unit.

20 Claims, 10 Drawing Sheets

(56) References Cited

U.S. PATENT DOCUMENTS

| | | | |
|---|---|---|---|
| 4,665,321 | A | 5/1987 | Chang et al. |
| 4,691,341 | A | 9/1987 | Knoble et al. |
| 4,718,079 | A | 1/1988 | Rabito |
| 4,808,982 | A | 2/1989 | Knapp |
| 4,810,936 | A | 3/1989 | Nuckolls et al. |
| 4,939,505 | A | 7/1990 | Cappellini et al. |
| 5,095,502 | A | 3/1992 | Finzel |
| 5,132,596 | A | 7/1992 | Walters et al. |
| 5,194,860 | A | 3/1993 | Jones et al. |
| 5,195,016 | A | 3/1993 | Powers |
| 5,239,236 | A | 8/1993 | Backstrom et al. |
| 5,397,963 | A | 3/1995 | Manson |
| 5,471,201 | A | 11/1995 | Cerami et al. |
| 5,479,159 | A | 12/1995 | Kelly et al. |
| 5,487,088 | A | 1/1996 | Weltz et al. |
| 5,553,094 | A | 9/1996 | Johnson et al. |
| 5,586,050 | A | 12/1996 | Makel et al. |
| 5,598,456 | A | 1/1997 | Feinberg |
| 5,625,260 | A | 4/1997 | Millgard |
| 5,668,537 | A | 9/1997 | Chansky et al. |
| 5,675,371 | A | 10/1997 | Barringer |
| 5,739,640 | A | 4/1998 | Noble |
| 5,748,104 | A | 5/1998 | Argyroudis et al. |
| 5,926,115 | A | 7/1999 | Schleder et al. |
| 5,962,991 | A | 10/1999 | Levy |
| 5,963,146 | A | 10/1999 | Holowick et al. |
| 6,035,266 | A | 3/2000 | Williams et al. |
| 6,072,984 | A | 6/2000 | Barringer |
| 6,119,076 | A | 9/2000 | Williams et al. |
| 6,204,615 | B1 | 3/2001 | Levy |
| 6,359,555 | B1 | 3/2002 | Williams |
| 6,370,489 | B1 | 4/2002 | Williams et al. |
| 6,377,001 | B2 | 4/2002 | Levy |
| 6,384,722 | B1 | 5/2002 | Williams |
| 6,393,381 | B1 | 5/2002 | Williams et al. |
| 6,393,382 | B1 | 5/2002 | Williams et al. |
| 6,415,245 | B2 | 7/2002 | Williams et al. |
| 6,441,565 | B1 | 8/2002 | Levy |
| 6,456,960 | B1 | 9/2002 | Williams et al. |
| 6,604,062 | B2 | 8/2003 | Williams et al. |
| 6,636,150 | B2 | 10/2003 | Williams |
| 6,714,895 | B2 | 3/2004 | Williams et al. |
| 6,791,284 | B1 | 9/2004 | Levy |
| 6,807,516 | B2 | 10/2004 | Williams et al. |
| 6,889,174 | B2 | 5/2005 | Williams et al. |
| 6,892,168 | B2 | 5/2005 | Williams et al. |
| 7,113,893 | B2 | 9/2006 | Williams et al. |
| 2002/0103621 | A1* | 8/2002 | Williams ............... H05B 47/19 702/182 |
| 2003/0001754 | A1 | 1/2003 | Johnson et al. |
| 2011/0031901 | A1* | 2/2011 | Huguenin .............. H05B 45/12 315/307 |
| 2014/0361888 | A1* | 12/2014 | Huang ................. G08B 25/009 340/539.1 |
| 2016/0095193 | A1* | 3/2016 | Mokhtari ............... H05B 47/19 315/307 |
| 2016/0353560 | A1* | 12/2016 | Bortolotti ............. F21V 14/003 |
| 2017/0080849 | A1* | 3/2017 | Nogha Mbai ........ B60Q 1/1423 |
| 2017/0223807 | A1* | 8/2017 | Recker ................. H05B 47/115 |
| 2021/0043059 | A1* | 2/2021 | Chen ................. H04W 52/0206 |

FOREIGN PATENT DOCUMENTS

| | | |
|---|---|---|
| KR | 199409501 | 10/1994 |
| WO | WO-90/04242 A1 | 4/1990 |

* cited by examiner

High—pressure mercury—vapor lamp

LAMP MONITORING AND CONTROL SYSTEM AND METHOD

CROSS-REFERENCE TO RELATED APPLICATION

This application claims the benefit of and priority to U.S. Provisional Application No. 63/349,435, filed Jun. 6, 2022, the entire disclosure of which is incorporated by reference herein.

BACKGROUND

The first street lamps were used in Europe during the latter half of the seventeenth century. These lamps consisted of lanterns which were attached to cables strung across the street so that the lantern hung over the center of the street. In France, the police were responsible for operating and maintaining these original street lamps while in England contractors were hired for street lamp operation and maintenance. In all instances, the operation and maintenance of street lamps was considered a government function.

The operation and maintenance of street lamps, or more generally any units which are distributed over a large geographic area, can be divided into two tasks: monitor and control. Monitoring includes the transmission of information from the distributed unit regarding the unit's status and controlling includes the reception of information by the distributed unit.

For the present example in which the distributed units are street lamps, monitoring includes periodic checks of the street lamps to determine if they are functioning properly. The controlling function comprises turning the street lamps on at night and off during the day.

Currently, most street lamps still use arc lamps for illumination. The mercury-vapor lamp is the most common form of street lamp in use today. In this type of lamp, the illumination is produced by an arc which takes place in a mercury vapor.

FIG. 1 shows the configuration of a conventional mercury-vapor lamp. FIG. 1 is provided only for demonstration purposes since there are a variety of different types of mercury-vapor lamps, as well as other types of lamps.

The mercury-vapor lamp includes an arc tube 110 which is filled with argon gas and a small amount of pure mercury. The arc tube 110 is mounted inside a large outer bulb 120 which encloses and protects the arc tube. Additionally, the outer bulb may be coated with phosphors to improve the color of the light emitted and reduce the ultraviolet radiation emitted. Mounting of the arc tube 110 inside the outer bulb 120 may be accomplished with an arc tube mount support 130 on the top and a stem 140 on the bottom.

Main electrodes 150 *a* and 150 *b*, with opposite polarities, are mechanically sealed at both ends of arc tube 110. The mercury-vapor lamp requires a sizeable voltage to start the arc between the main electrodes 150 *a* and 150 *b*.

The starting of the mercury-vapor lamp is-controlled by a starting circuit (not shown in FIG. 1) which is attached between the power source (not shown in FIG. 1) and the lamp. Generally, there is no standard starting circuit for mercury-vapor lamps. After the lamp is started, the lamp current continues to increase unless the starting circuit limits the current. Typically, the lamp current is limited by a resistor, which severely reduces the efficiency of the circuit, or by a magnetic device, such as a choke or a transformer, referred to as a ballast.

During the starting operation, electrons move through a starting resistor 160 to a starting electrode 170 and across a short gap between the starting electrode 170 and the main electrode 150 *b* of opposite polarity. The electrons cause ionization of some of the argon gas in the arc tube. The ionized gas diffuses until a main arc develops between the two opposite polarity main electrodes 150 *a* and 150 *b*. The heat from the main arc vaporizes the mercury droplets to produce ionized current carriers. As the lamp current increases, the ballast acts to limit the current and reduce the supply voltage to maintain stable operation and extinguish the arc between the main electrode 150 *b* and starting electrode 170.

Because of the variety of different types of starter circuits, it can be difficult to characterize the current and voltage characteristics of the mercury-vapor lamp. Often, the mercury-vapor lamp may require minutes of warm-up before light is emitted. Additionally, if power is lost, the lamp must cool and the mercury pressure must decrease before the starting arc can start again.

The mercury-vapor lamp has become one of the predominant types of street lamp with millions of units produced annually. The current installed base of these street lamps is enormous with more than 500,000 street lamps in Los Angeles alone. The mercury-vapor lamp is not the most efficient gaseous discharge lamp, but is preferred for use in street lamps because of its long life, reliable performance, and relatively low cost.

Although the mercury-vapor lamp has been used as a common example of current street lamps, there is increasing use of other types of lamps such as metal halide, high pressure sodium and light emitting diodes (LEDs). All of these types of lamps require a starting circuit which makes it difficult to characterize the current and voltage characteristics of the lamp.

FIG. 2 shows a lamp arrangement 201 with a typical lamp sensor unit 210 which is situated between a power source 220 and a lamp assembly 230. The lamp assembly 230 includes a lamp 240 (such as the mercury-vapor lamp presented in FIG. 1) and a starting circuit 250.

Most cities currently use automatic lamp control units to control the street lamps. These lamp control units provide an automatic, but decentralized, control mechanism for turning the street lamps on at night and off during the day.

A conventional street lamp assembly 201 includes a lamp sensor unit 210 which in turn includes a light sensor 260 and a relay 270 as shown in FIG. 2. The lamp sensor unit 210 is electrically coupled between the external power source 220 and the starting circuit 250 of lamp assembly 230. There is a hot line 280 *a* and a neutral line 280 *b* providing electrical connection between the power source 220 and the lamp sensor unit 210. Additionally, there is a switched line 280 *c* and a neutral line 280 *d* providing electrical connection between the lamp sensor unit 210 and the starting circuit 250 of the lamp assembly 230.

From a physical standpoint, most lamp sensor units 210 use a standard three prong plug, for example a twist lock plug, to connect to the back of lamp assembly 230. The three prongs couple to hot line 280 *a*, switched line 280 *c*, and neutral lines 280 *b* and 280 *d*. In other words, the neutral lines 280 *b* and 280 *d* are both connected to the same physical prong since they are at the same electrical potential. Some systems also have a ground wire, but no ground wire is shown in FIG. 2 since it is not relevant to the operation of lamp sensor unit 210.

Power source 220 may be a standard 115 Volt, 60 Hz source from a power line. Of course, a variety of alternatives are available for power source 220. In foreign countries, power source 220 may be a 220 Volt, 50 Hz source from a power line. Additionally, power source 220 may be a DC voltage source or, in certain remote regions, it may be a battery which is charged by a solar reflector.

An exemplary operation of the lamp sensor unit 210 is as follows. At sunset, when the light from the sun decreases below a sunset threshold, the light sensor 260 detects this condition and causes the relay 270 to close. Closure of the relay 270 results in electrical connection of the hot line 280 *a* and the switched line 280 *c* with power being applied to the starting circuit 250 of the lamp assembly 230 to ultimately produce light from the lamp 240. At sunrise, when the light from the sun increases above a sunrise threshold, the light sensor 260 detects this condition and causes the relay 270 to open. Opening of relay 270 eliminates electrical connection between the hot line 280 *a* and the switched line 280 *c* and causes the removal of power from the starting circuit 250 which turns the lamp 240 off.

The lamp sensor unit 210 provides an automated, distributed control mechanism to turn the lamp assembly 230 on and off. However, it does not provide a mechanism for centralized monitoring of the street lamp to determine if the lamp is functioning properly. This problem is particularly important with respect to the street lamps on major boulevards and highways in large cities. When a street lamp burns out over a highway, it is often not replaced for a long period of time because the maintenance crew only schedules a replacement lamp when someone calls the city maintenance department and identifies the exact pole location of the malfunctioning street lamp. Since most automobile drivers will not stop on the highway just to report a malfunctioning street lamp, the malfunctioning lamp can go unreported indefinitely.

Additionally, if a lamp is producing light but has a hidden problem, visual monitoring of the lamp is not able to detect the problem. Some examples of hidden problems relate to current use by the lamp (e.g., a lamp drawing significantly more current than is normal) or voltage use by the lamp (e.g., the power supply is not supplying the appropriate voltage level to the street lamp).

Furthermore, the conventional system of lamp control, in which an individual light sensor is located at each street lamp, is a distributed control system which does not allow for centralized control. For example, if the city or other monitoring organization wanted to turn on or off all of the street lamps in a certain area at a certain time, this could not be done because of the distributed nature of the present lamp control circuits.

Because of these limitations, a new type of distributed unit monitoring and control system is needed which allows centralized monitoring and/or control of the distributed units in a geographical area. Further, a new type of lamp monitoring and control system is needed which allows centralized monitoring and/or control of the street lamps in a geographical area. There is also a need for an inexpensive, reliable monitoring and control system. Further there is a need for a monitoring system that is able to handle the traffic generated by communication with the millions of currently installed street lamps. Further, there is a need for a monitoring system that can be easily integrated into existing light infrastructures and devices. Further still, there is a need for a control system that can be easily integrated into existing light infrastructures and devices.

Although the above discussion has presented street lamps as an example, there is a more general need for a new type of monitoring and control system which allows centralized monitoring and/or control of units distributed over a large geographical area.

SUMMARY

One embodiment relates to at least one lamp monitoring device configured to be disposed at a location of a lamp. The lamp monitoring device includes a processing circuit, a transmit circuit, and an optical sensor configured to collect image data associated with the lamp. The at least one lamp monitoring device is adapted to wirelessly transmit monitoring data associated with the image collected by the optical sensor.

One embodiment relates to a lamp monitoring and control system for monitoring and controlling at least one lamp, including at least one lamp monitoring and control device, adapted to be coupled to a lamp, disposed substantially near a top of a lamp pole. The lamp monitoring and control device includes a processing circuit, a transmit circuit, and an optical sensor configured to collect image data associated with the lamp. The system further includes at least one station configured to receive monitoring data from the at least one lamp monitoring and control device; a network communication server in communication with the at least one station; and at least one user interface unit in communication with the network communication server. The at least one lamp monitoring and control device is adapted to wirelessly transmit the monitoring data to the at least one station without prompting from the at least one station.

Another embodiment relates to a lamp monitoring and control system for monitoring and controlling at least one lamp, including at least one lamp monitoring and control device, adapted to be coupled to a lamp, disposed substantially near a top of a lamp pole. The lamp monitoring and control device includes a processing circuit, a transmit circuit, a power source control module, and an optical sensor configured to collect image data associated with the lamp monitoring and control system. The system further includes at least solar panel provided in proximity to the lamp, the solar panel being configured to provide power to the lamp; at least one station configured to receive monitoring data from the at least one lamp monitoring and control device; a network communication server in communication with the at least one station; and at least one user interface unit in communication with the network communication server. The at least one lamp monitoring and control device is adapted to wirelessly transmit the monitoring data to the at least one station without prompting from the at least one station. The power source control module controls and monitors the power flow from the solar panel to the lamp.

Yet another embodiment relates to a method for monitoring a lamp assembly. The method includes capturing image data related to an object of interest with the optical sensor disposed near an object of interest related to the lamp assembly, and transmitting the image data from the optical sensor to a processing circuit of a lamp monitoring and control device. The method also includes transmitting the image data from the processing circuit to a base station using a transmit unit.

BRIEF DESCRIPTION OF THE DRAWINGS

The exemplary embodiments will be described in detail with reference to the following drawings in which like reference numerals refer to like elements wherein.

DETAILED DESCRIPTION

The exemplary embodiments of a lamp monitoring and control system (LMCS) and method, which allows centralized monitoring and/or control of street lamps, are described with reference to the accompanying figures. While the embodiments are described with reference to an LMCS, the disclosure is not limited to this application and can be used in any application which requires a monitoring and control system for centralized monitoring and/or control of devices distributed over a large geographical area. Additionally, the term street lamp in this disclosure is used in a general sense to describe any type of street lamp or light, security lamp, area lamp, or outdoor lamp.

Figure 3:
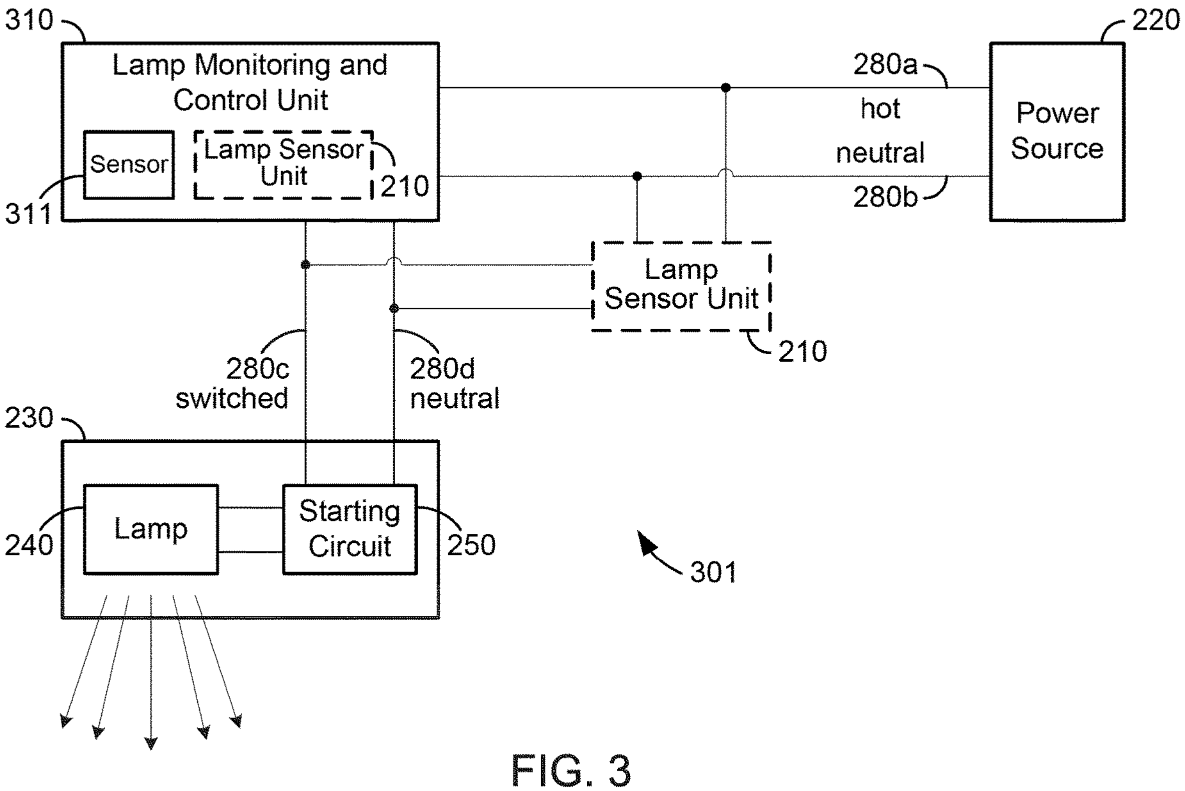
FIG. 3 shows a lamp arrangement, according to some embodiments, comprising a lamp monitoring and control unit situated between a power source and a lamp assembly.

FIG. 3 shows a lamp arrangement 301 which includes a lamp monitoring and control unit 310, according to some embodiments. The operation of certain components of lamp monitoring and control unit 310 is discussed in detail in U.S. Pat. No. 7,120,560, incorporated herein in its entirety. The lamp monitoring and control unit 310 is situated between a power source 220 and a lamp assembly 230. The lamp assembly 230 includes a light or lamp 240 and a starting circuit 250.

The power source 220 may be a standard 115 volt, 60 Hz source supplied by a power line in some embodiments. A variety of alternatives are available for the power source 220. In foreign countries, the power source 220 may be a 220 volt, 50 Hz source from a power line. Additionally, the power source 220 can be a DC voltage source, such as a battery which is charged by a solar panel, wind turbine, or other power generation device, as described in more detail below. Power source 220 can be any device for providing electrical energy to the lamp monitoring and control unit 310 and/or lamp assembly 230.

Figure 1:
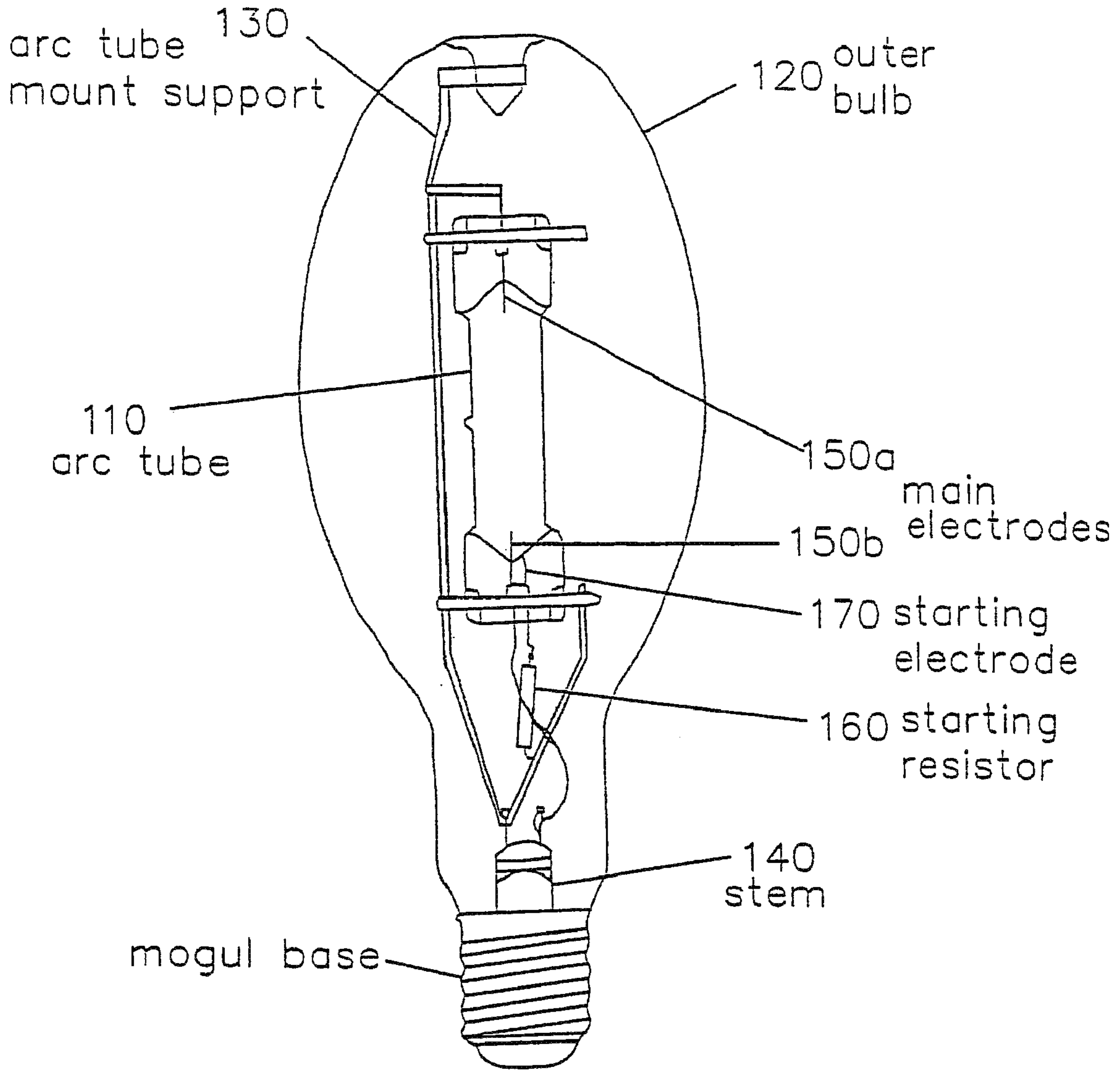
FIG. 1 Prior Art
FIG. 1 shows a configuration of a conventional mercury-vapor lamp.
Figure 2:
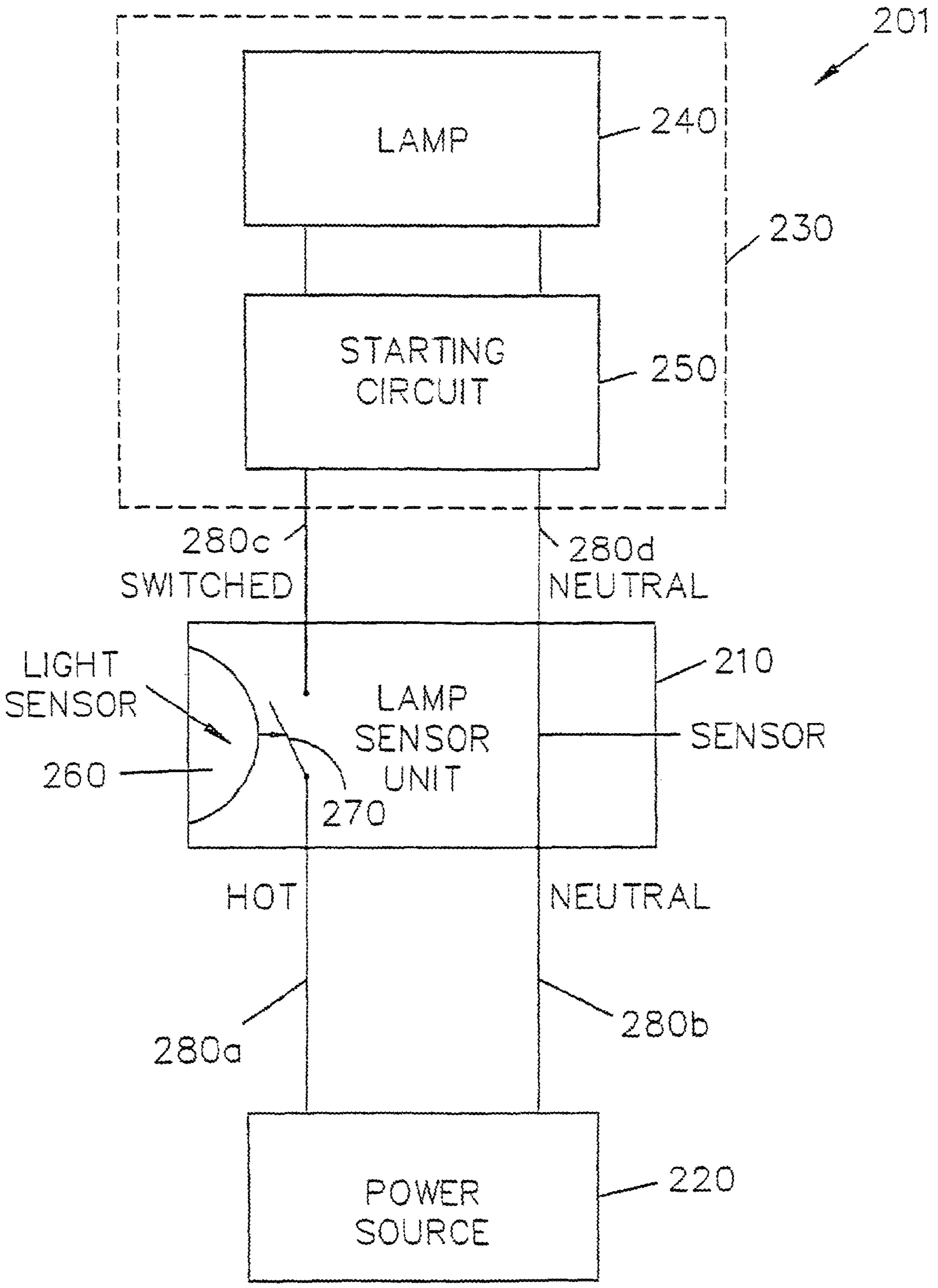
FIG. 2 Prior Art
FIG. 2 shows a configuration of a conventional lamp arrangement comprising a lamp sensor unit situated between a power source and a lamp assembly.

In some embodiments, the lamp monitoring and control unit 310 can include the components of the lamp sensor unit 210. In other embodiments, the lamp monitoring and control unit 310 can be provided separately from the lamp sensor unit 210. The lamp sensor unit 210 includes a light sensor 260 and a relay 270 which is used to control lamp assembly 230 by automatically switching the hot line 280 *a* to the switched line 280 *c* depending on the amount of ambient light received by light sensor 260 as shown in FIG. 2.

The lamp monitoring and control unit 310 provides several functions including a monitoring function which is not provided by the lamp sensor unit 210. The lamp monitoring and control unit 310 is electrically located between the external power source 220 and the starting circuit 250 of lamp assembly 230. The power source 220 is electrically connected to the lamp monitoring and the control unit 310 with a hot line 280 *a* and a neutral line 280 *b*. The lamp monitoring and control unit 310 is electrically connected to the starting circuit 250 of the lamp assembly 230 with a switched line 280 *c* and a neutral line 280 *d* in some embodiments.

From a physical standpoint, the lamp monitoring and control unit 310 uses a standard three-prong plug to connect to the back of the lamp assembly 230 in some embodiments. The three prongs in the standard three-prong plug represent hot line 280 *a*, switched line 280 *c*, and neutral lines 280 *b* and 280 *d*. In other words, the neutral lines 280 *b* and 280 *d* are both connected to the same physical prong and share the same electrical potential. In some embodiments, the lamp monitoring and control unit 310 may be positioned above the lamp assembly 230 in some embodiments.

Although use of a three-prong plug is recommended because of the substantial number of street lamps using this type of standard plug, additional types of electrical connection may be used without departing from the disclosure of the exemplary embodiments. For example, a standard power terminal block or AMP power connector is used in some embodiments.

In some embodiments, the lamp monitoring and control circuit 310 includes a sensor 311. The sensor 311 is a camera, optical sensor, an environmental sensor, a Geiger counter, an olfaction sensor, an acoustic sensor, or a vibration sensor in some embodiments. Sensor 311 provides data related to the lamp 240 or the environment there of. The data can be used to provide warnings, summon maintenance personnel, turn lamp 240 on or off, or be used in other environmental analysis.

Figure 4:
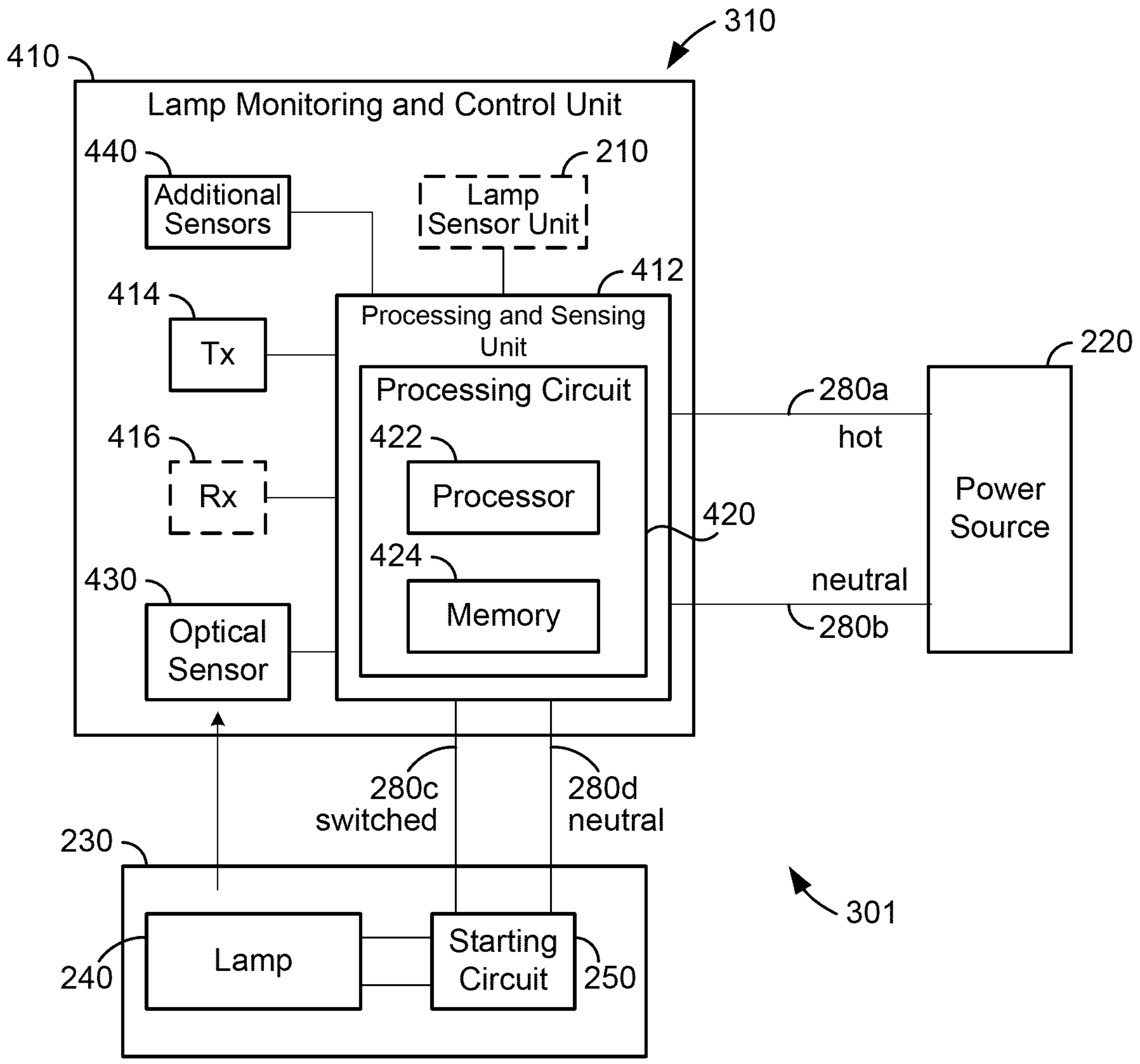
FIG. 4 shows a lamp monitoring and control unit, according to some embodiments, including a processing and sensing unit, a TX unit, an RX unit, and an optical sensor.

FIG. 4 shows a more detailed diagram of the lamp monitoring and control unit 310, according to an exemplary embodiment. The lamp monitoring and control unit 310 includes a processing and sensing unit 412, a transmit (TX) unit 414, and an optional receive (RX) unit 416. The processing and sensing unit 412 includes a processing circuit 420 with a processor 422 and memory 424. The processing circuit 420 is a circuit containing one or more processing components (e.g., the processor 422) or a group of distributed processing components in some embodiments. The processor 422 can be a general purpose or specific purpose processor, an application specific integrated circuit (ASIC), programmable logic device, combinations thereof or other circuitry configured to execute computer code or instructions stored in the memory or received from other computer readable media (e.g., CDROM, network storage, a remote server, etc.) in some embodiments. The processing circuit 420 also includes memory 424. Memory 424 can be RAM, hard drive storage, temporary storage, non-volatile memory, flash memory, optical memory, or any other suitable memory for storing software objects and/or computer instructions. When the processor 422 executes instructions stored in the memory 424 for completing the various activities described herein, the processor 422 generally configures the computer system and more particularly the processing circuit 420 to complete such activities. Memory 424 can include database components, object code components, script components, and/or any other type of information structure for supporting the various activities described in the present disclosure. According to some exemplary embodiment, memory 424 is communicably connected to the processor 422 and includes computer code for executing one or more processes described herein and the processor 422 is configured to execute the computer code.

The processing and sensing unit 412 is electrically connected to the hot line 280 *a*, the switched line 280 *c*, and the neutral lines 280 *b* and 280 *d*. Furthermore, the processing and sensing unit 412 is connected to the TX unit 414 and the RX unit 416. In an exemplary application, the TX unit 414 can be used to transmit monitoring data and the RX unit 416 can be used to receive control information. For applications in which external control information is not required or desired, the RX unit 416 can be omitted from lamp monitoring and control unit 310.

The lamp monitoring and control unit 310 further includes an optical sensor 430 (e.g., sensor 311 (FIG. 3). The optical sensor 430 is configured to monitor the light output of the lamp 240 to verify the actual status of the lamp assembly 230. The optical sensor 430 is, for example, a camera that is configured to detect the visual spectrum. In other embodiments, the optical sensor 430 is configured to detect another portion of the electromagnetic spectrum (e.g., infrared, ultraviolet, etc.). The optical sensor 430 includes an array of light sensitive pixels in some embodiments. According to an exemplary embodiment, the optical sensor 430 is disposed within a housing 410 of the lamp monitoring and control unit 310 and is oriented such that it is facing the lamp 240 or otherwise senses operation of the lamp 240. The optical sensor 430 records an image of the lamp 240 and transfers the image data to the processing and sensing unit 412, which periodically transmits the image data to a user via a remote base station. The optical sensor can be one or more of an infrared and a visible light camera.

The image data collected by the optical sensor 430 can be utilized for a variety of monitoring and diagnostic tasks. In one embodiment, the image data collected by the optical sensor 430 can be used to determine if the lamp 240 is on or off. The determination of whether the lamp is on or off can be made locally, by the processing circuit 420. For example, the image data can be processed to determine the brightness of the image. If the image is above a predetermined brightness threshold, the lamp monitoring and control unit 310 transmits a signal via the TX unit 414 unit indicating that the lamp 240 is on in some embodiments. If the image is below the predetermined brightness threshold, the lamp monitoring and control unit 310 transmits a signal via the TX unit 414 unit indicating that the lamp 240 is off in some embodiments. In other embodiments, the image data is transmitted to a remote location via the TX unit 414 and the status of the lamp 240 is determined by visual verification of a remote user or by analysis of a remote computer. A timestamp or other additional data is included with the image data transmission, in some embodiments.

In other embodiments, the image data collected by the optical sensor 430 can be utilized to determine the health or estimated remaining lifespan of the lamp 240. The lamp 240 can be a high pressure sodium lamp. Such a lamp loses sodium and experiences an increases internal pressure and voltage requirement as it ages. If the voltage requirements exceed the output of the starting circuit 250, the lamp will turn off, cool down, and then turn back on (e.g., cycle). The image data collected by the optical sensor 430 can be utilized to detect cycling behavior, indicating that the lamp 240 is to be replaced. In some embodiments, time stamps associated with a changing image are used to determine cycling. In some embodiments, on/off times changing within a frequency less than daily are an indication of cycling. The cycling determination can be made locally, by processing circuit 420 or may be made remotely. In some embodiments, the cycling determination is made locally and a cycling warning is transmitted to a remote user instead of the image data.

In other embodiments, the lamp 240 can be an LED lamp. The high temperatures at which LEDs can operate can influence the long-term color stability of the lamp. The phosphors used to convert narrow-band LED emission to a broader range of wavelengths can settle, curl, delaminate, or otherwise change the amount of photons that are converted, with the effect being that perceived color of the LED lamp can shift over time. The image data collected by the optical sensor 430 can be utilized to detect color shift of the lamp 240.

In some embodiments, a baseline image is sent and image data is not resent until there is a substantial change in the image. For example, in some embodiments, after the baseline image is sent, image data is not transmitted until there is a substantial change in the brightness of the lamp 240 or a substantial change in the color of the lamp 240. Various video processing and image processing techniques can be utilized to analyze the image data including image compare algorithms. The memory 424 can store baseline color or brightness images for the image comparison in some embodiments. The baseline and brightness images can be preset or captured during installation or calibration. Target identification algorithms can be utilized to identify objects in the sense image that may affect the sensing of color or brightness in the some embodiments. Filtering and integration techniques can also be used to increase the accuracy of the sensed image in some embodiments.

Figure 5:
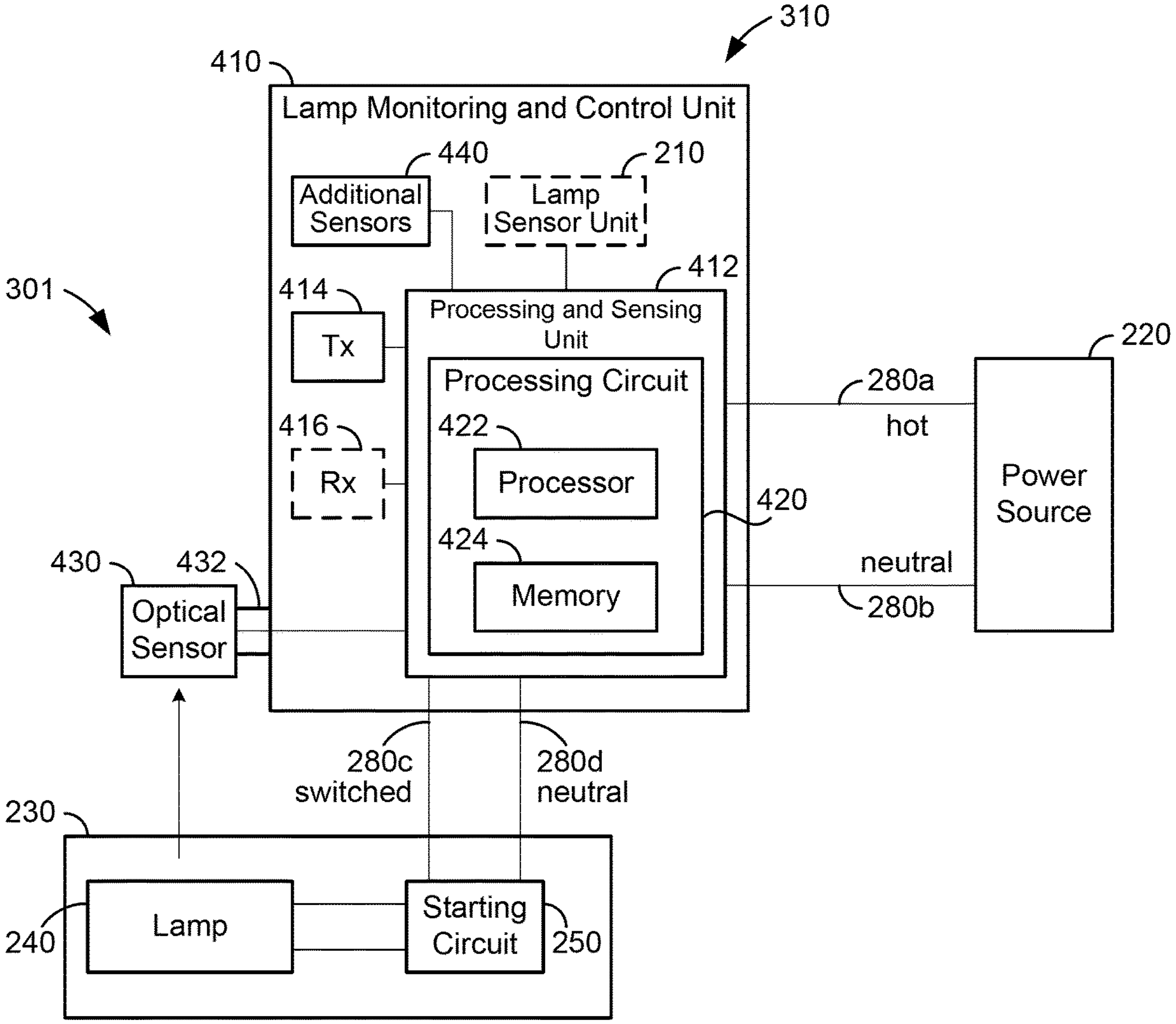
FIG. 5 shows a lamp monitoring and control unit, according to some embodiments, including a processing and sensing unit, a TX unit, an RX unit, and a moveable optical sensor.

FIG. 5 shows the lamp monitoring and control unit 310 according to another embodiment in which the optical sensor 430 is coupled to the housing 410 with a moveable base 432. The moveable base 432 is operated based on control signals from the on-board processing circuit 420 in some embodiments. The control signals can be automated control signal stored in memory 424 or can be control signals received from a remote operator via the RX unit 416 (e.g., a remote user controlling the positioning of the optical sensor 430 remotely with a joystick, keypad, or other suitable input device, in some embodiments). The moveable base 432 can be moveable about a single rotational axis or linear direction or can be moveable about multiple rotational axis or linear directions in some embodiments.

In some embodiments, the optical sensor 430 is not provided in the lamp monitoring and control unit 310 above the lamp assembly 230. For example, in some embodiments, the optical sensor 430 is coupled to a pole to which the lamp assembly is coupled and is oriented toward the lamp 240.

In some embodiments, the optical sensor 430 is utilized to collect other data. For example, the optical sensor 430 can collect environmental data to monitor natural phenomena, such monitoring river levels to predict flash floods; the optical sensor 430 can collect data to monitor man-made structures, such as monitoring bridges or other structures to measure vibration and deflection of the structures; or the optical sensor 430 can collect data on human activity, such as monitoring crowd density or detecting muzzle flashes from firearms.

In some embodiments, the optical sensor 430 is oriented to collect images of the surface of a solar panel. The image data collected by the optical sensor 430 is analyzed to determine when maintenance is required for a solar panel by monitoring the amount of dirt, dust, or other debris collected on the surface of the solar panel. The analysis of the image data is accomplished automatically and a warning is transmitted to a person, in some embodiments. In other embodiments, the image data is analyzed directly by a person to determine if maintenance of the solar panel is needed. In some embodiments, the solar panel is associated with providing power to a sign, a lamp, a sensor, or other device. In some embodiments, the solar panel is part a solar farm or is a panel on a building, house, or other facility.

As shown in FIGS. 4 and 5, the lamp monitoring and control unit 310 optionally includes additional sensors 440. For example, the lamp monitoring and control unit 310 can include an olfaction sensor to detect odorant compounds (e.g., natural gas), a Geiger counter to detect radiation, an acoustic sensor (e.g., to detect gunshots), a vibration sensor, or any other suitable sensor that can be advantageously used to collect distributed readings at multiple lamp arrangements. The data collected from the additional sensors can be transmitted back to a base station or other central location for analysis. In some embodiments, one of the additional sensors 440 is provided and the optical sensor 430 is not provided.

Figure 6:
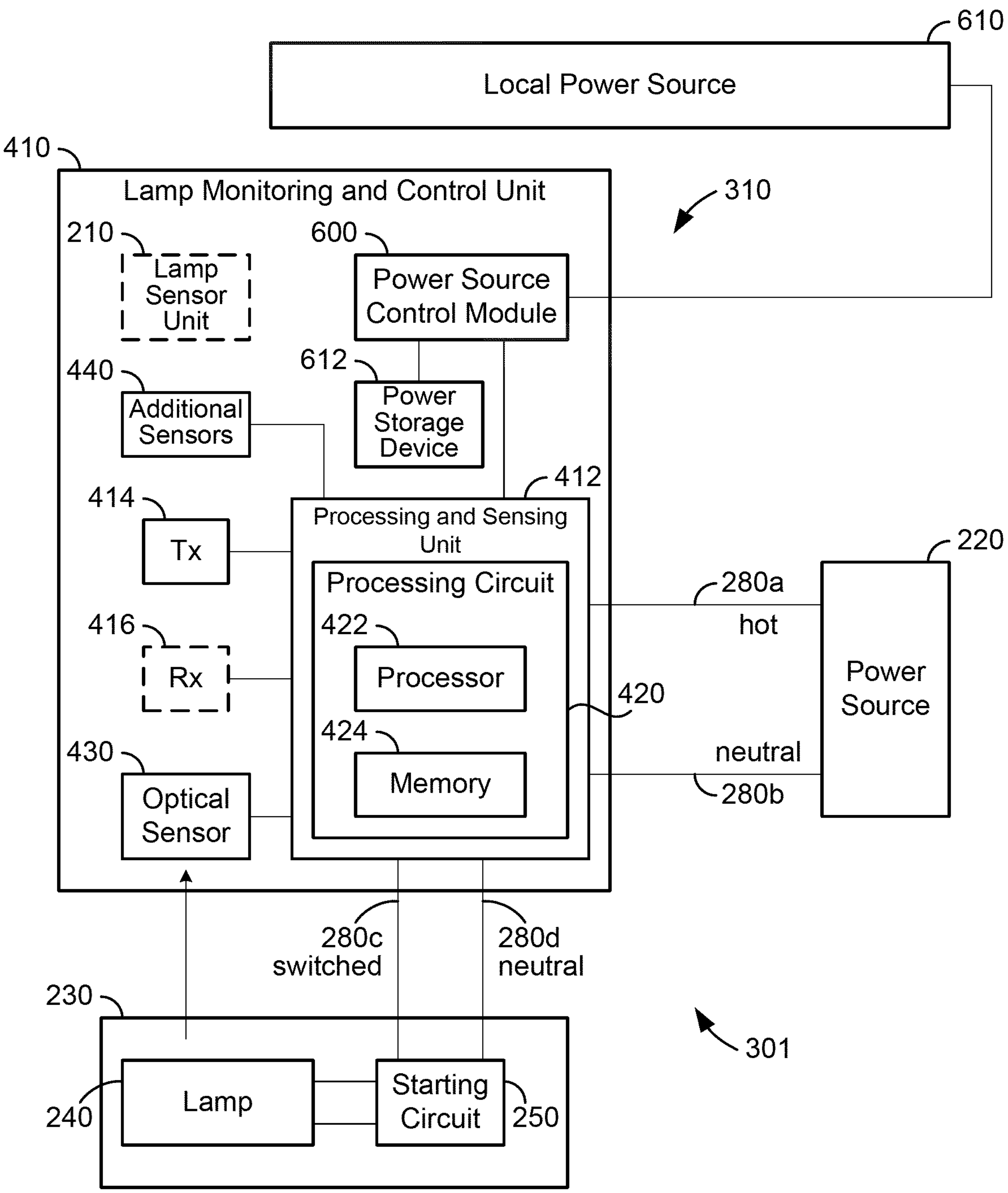
FIG. 6 shows a lamp monitoring and control unit, according to some embodiments, including a processing and sensing unit, a TX unit, an RX unit, an optical sensor, and a power source control module.

FIG. 6 shows a more detailed diagram of the lamp monitoring and control unit 310, according to another exemplary embodiment, including an auxiliary power source control module 600. The control module 600 is configured to monitor the power provided by a local power source 610, such as a wind turbine or a solar panel mounted to a pole with a lamp assembly 230 to provide power to the lamp assembly 230. Power can be stored in a power storage device 612 (e.g. battery, capacitor, super capacitor, etc.). Excess power provided by the local power source 610 can be routed back to the power source 220 (e.g., the electrical grid). The power control module 600 monitors the power flow between the power storage device 612, the lamp assembly 230, and the power source 220. In this way, the net power transfer from the individual lamp arrangement 301 or a network of lamp arrangements 301 and the power source 220 can be monitored in some embodiments.

Figure 7:
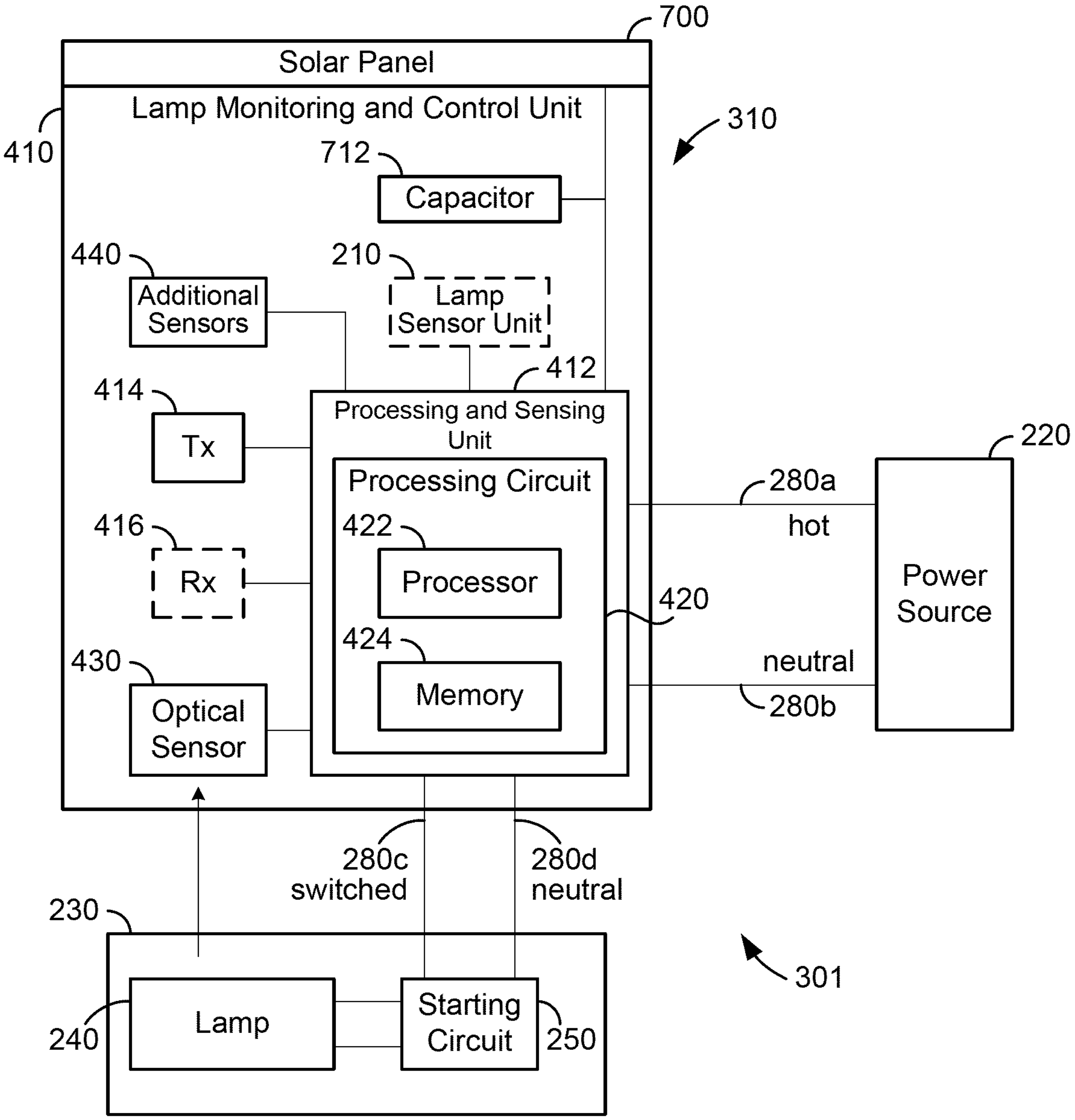
FIG. 7 shows a lamp monitoring and control unit, according to some embodiments, including a processing and sensing unit, a TX unit, an RX unit, an optical sensor, an integral solar panel, and a power storage device in the form of a capacitor.

FIG. 7 shows a more detailed diagram of the lamp monitoring and control unit 310, according to another exemplary embodiment, including an integrated solar panel 700. The solar panel 700 may, for example, be provided on the upper surface of the housing 410 of the lamp monitoring and control unit 310. In some embodiments, the solar panel 700 can provide power to a power storage device (e.g., a battery), during the day to partially offset the draw of the lamp assembly 230 on the power source 220 at night, as described above. In another embodiment, as shown in FIG. 7, the solar panel 700 can charge a capacitor 710. If the power provided to the lamp assembly 230 from the power source 220 is interrupted, such as during a local power outage, the capacitor 710 can discharge to operate a power supply for the processing and sensing unit 412 for a short period of time (e.g., 3-6 seconds). This period of operation allows the processing and sensing unit 412 to transmit a status message with the transmit unit 414 indicating that lamp assembly 230 is experiencing an outage of remote power. A power sensor can be provided to sense if power is not being provided at hot line 280 *a* and neutral line 280 *b*.

Figure 8:
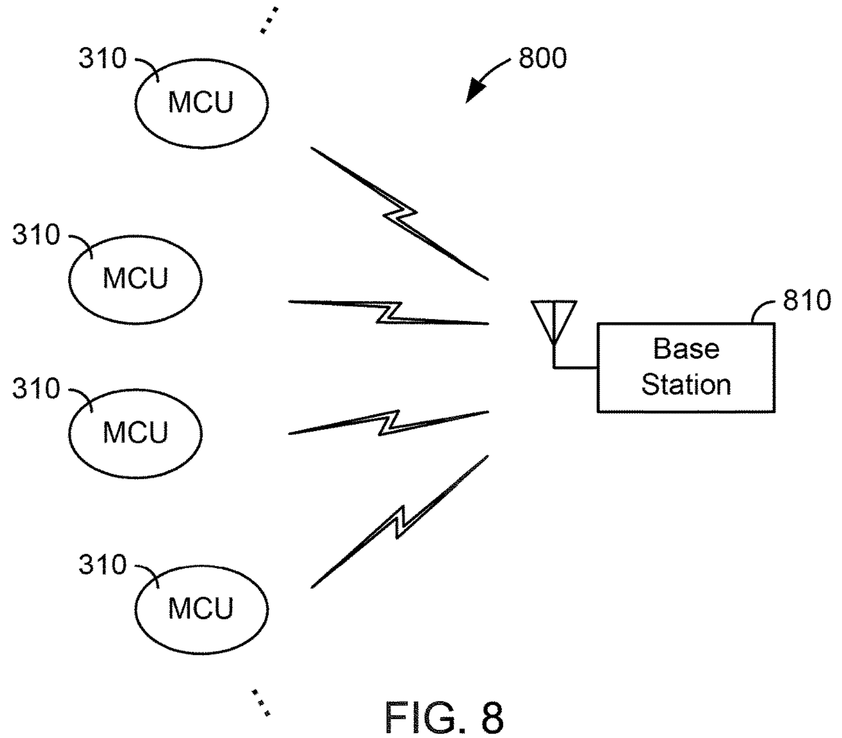
FIG. 8 shows a monitoring and control system, according to some embodiments, including a base station and a plurality of monitoring and control units.

FIG. 8 shows a monitoring and control system 800, according to one embodiment of the invention, including a base station 810 and a plurality of monitoring and control units 310 *a-d*. Each of the monitoring and control units 310 *a-d* can transmit monitoring data through its associated TX unit 414 (FIGS. 4-7) to the base station 810 and receive control information through the RX unit 418 from the base station 810.

Communication between monitoring and control units 310 *a-d* and the base station 810 can be accomplished in a variety of ways, depending on the application, such as using: RF, wire, coaxial cable, or fiber optics. For lamp monitoring and control system 800, RF is the preferred communication link due to the costs required to build the infrastructure for any of the other options.

In some embodiments, control units 310 can provide a wireless network access using the transmit units 414 and receive units 616. For example, the control units 310 can provide a wireless network for a restricted group of people, such as city workers, police, maintenance personnel, or can provide a public wireless network.

Figure 9:
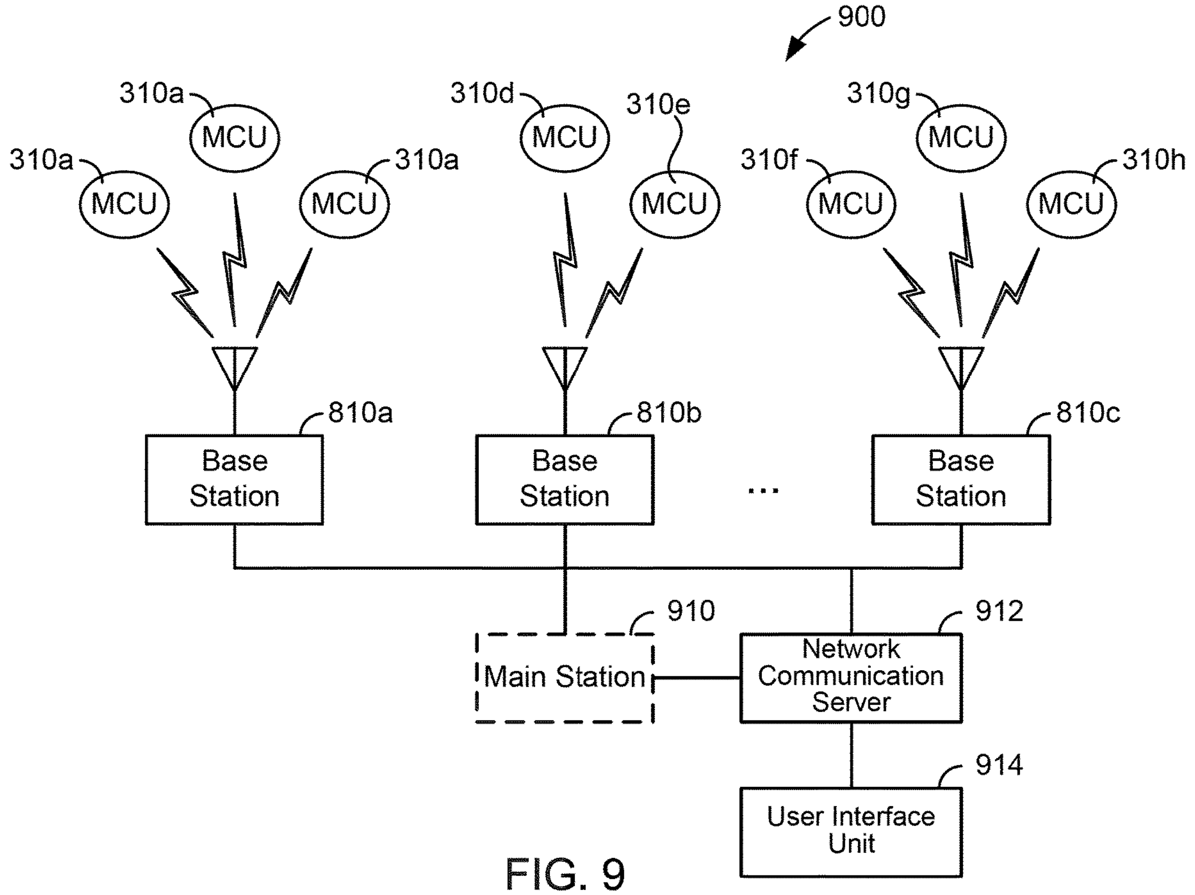
FIG. 9 shows a monitoring and control system, according to some embodiments, including a plurality of base stations, each having a plurality of associated monitoring and control units.

FIG. 9 shows a monitoring and control system 900, according to another embodiment of the invention, including a plurality of base stations 810 *a-c*, each having a plurality of associated monitoring and control units 310 *a-h*. Each base station 810 *a-c* is generally associated with a particular geographic area of coverage. For example, the first base station 810 *a*, communicates with monitoring and control units 310 *a-c* in a limited geographic area. If monitoring and control units 310 *a-c* are used for lamp monitoring and control, the geographic area can consist of a section of a city. For example, monitoring and control system 900 can be used to turn off lamps in a particular area and receive data from infrared sensors at each of units 310 *a-h* in the event of a security situation, such as, criminal activity.

Although the example of geographic area is used to group monitoring and control units 310 *a-c*, it is well known to those skilled in the art that other groupings can be used. For example, to monitor and control lamp assemblies made by different manufacturers, monitoring and control system 900 can use groupings in which base station 810 *a* services one manufacturer and base station 810 *b* services a different manufacturer. In this example, bases stations 810 *a* and 810 *b* can be servicing overlapping geographical areas.

FIG. 9 also shows a communication link between base stations 810 *a-c*. This communication link is shown as a bus topology, but can alternately be configured in a ring, star, mesh, or other topology. An optional main station 910 can also be connected to the communication link to receive and concentrate data from base stations 810 *a-c*. The media used for the communication link between base stations 810 *a-c* can be: RF, wire, coaxial cable, or fiber optics.

A communication server 912 is coupled to a station (e.g., base station 810 and/or main station 910. In some embodiments, communication server 912 is coupled to the station with an antenna or an array of antennas or with a wired connection (e.g., a standard phone line, DDS line, ISDN line, Ti, fiber optic line, etc.). A user interface unit 914 is coupled to the communication server. The user interface unit 914 allows a user to view the image data or other data, warnings, or control signals transmitted by the control unit 310.

Figure 10:
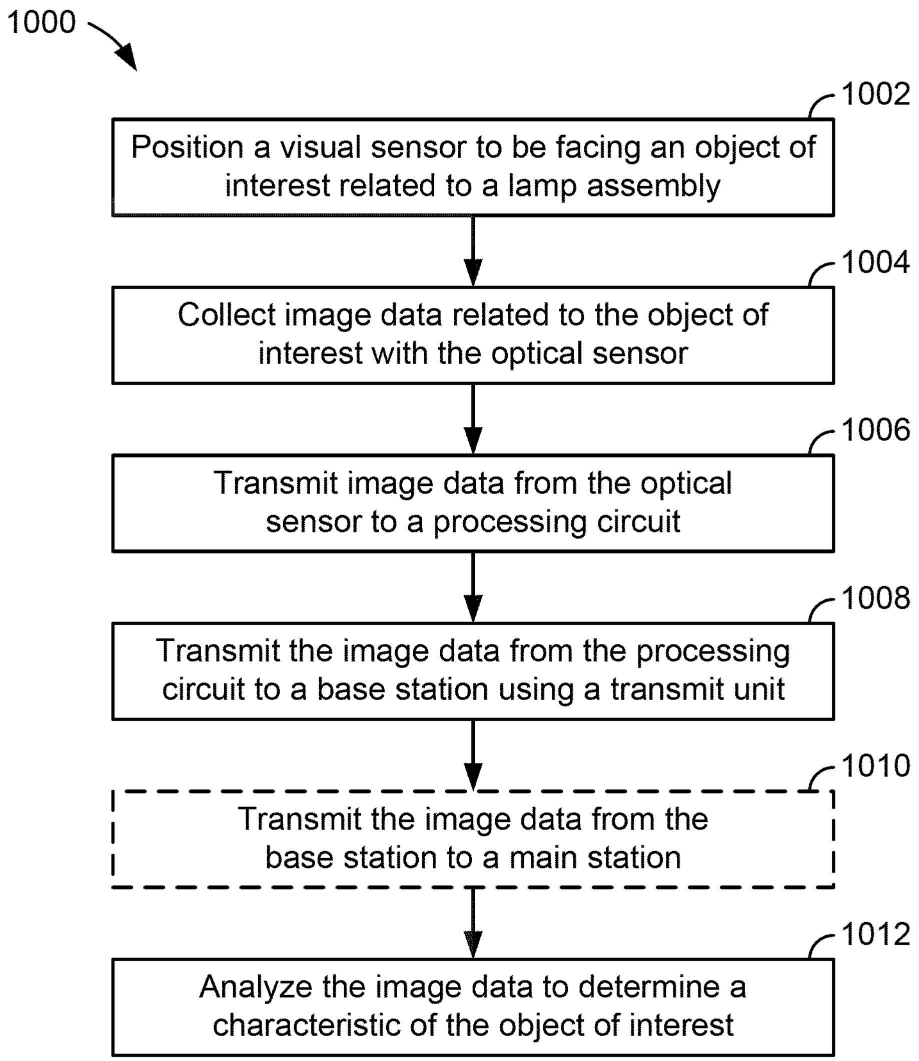
FIG. 10 shows a flow of monitoring an object of interest related to the lamp assembly, according to some embodiments.

FIG. 10 shows an exemplary flow 1000 for monitoring a lamp assembly. The method of FIG. 10 shows a single transmission for each control event. In a first operation 1002, an optical sensor is positioned to be facing an object of interest related to the lamp assembly. The object of interest, for example, can be the lamp, the surface of a solar panel providing power to the lamp, or the environment in the vicinity of the lamp assembly. The optical sensor can be rigidly mounted to be permanently facing the object of interest or can be reoriented on a moveable base structure to be facing the object of interest (e.g., via remote control signals received by receive unit and communicated to an actuator controlling the moveable base structure). In a second operation 1004, image data related to the object of interest is captured by the optical sensor. In a third operation 1006, the image data is transmitted from the optical sensor to a processing circuit. In a fourth operation 1008, the image data is transmitted from the processing circuit to a base station using a transmit unit. Image data from multiple optical sensors associated with multiple lamp assemblies can be transmitted to a single base station. In an optional operation 1010, the image data can be transmitted from the base station to a main station. The data collected by multiple base stations can be transmitted to a single main station. In a sixth operation 1012, the image data is analyzed to determine a characteristic of the object of interest. For example, the image data can be analyzed to determine if the lamp is on or off, if the surface of the solar panel is obstructed, or if the environment in proximity to the lamp assembly is changing (e.g., rising water in a nearby waterway, etc.).

Figure 11:
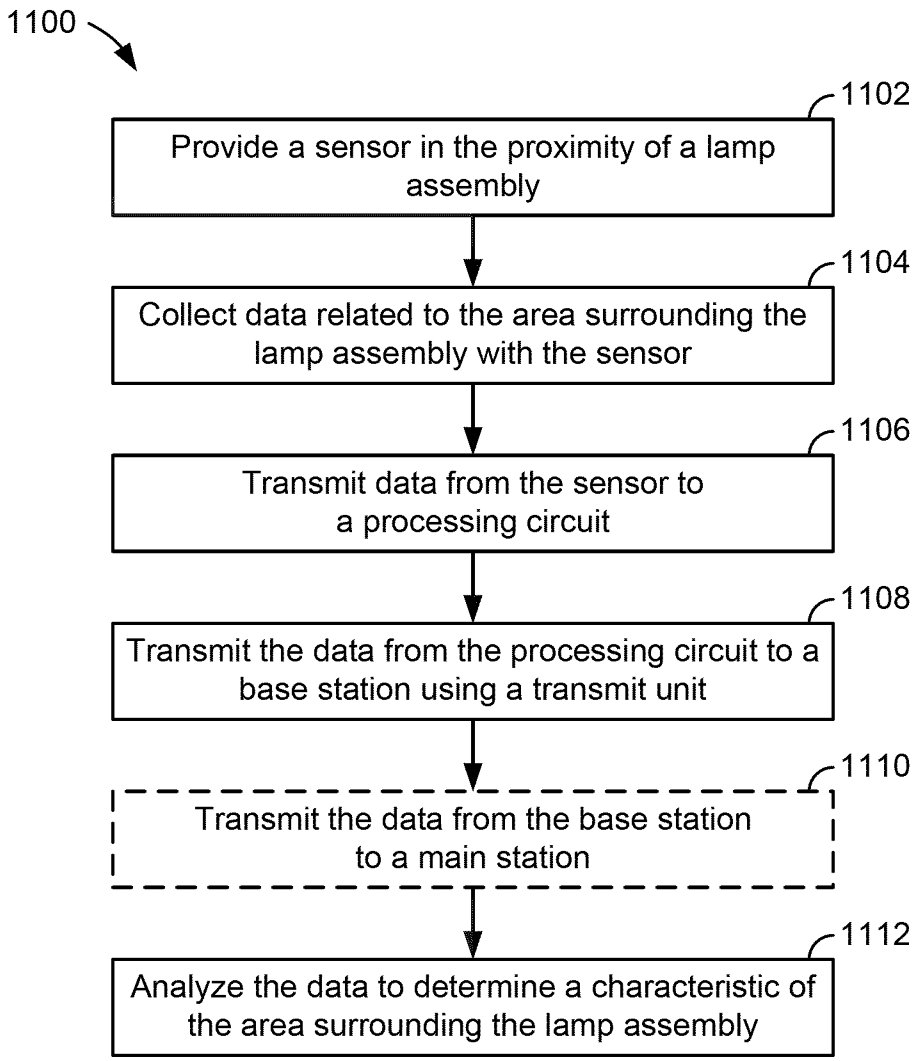
FIG. 11 shows a flow of 1100 for monitoring an area surrounding a lamp assembly, according to some embodiments.

FIG. 11 shows an exemplary flow 1100 for monitoring the area surrounding a lamp assembly. The flow of FIG. 11 shows a single transmission for each control event. In a first operation 1102, a sensor is provided in the proximity of the lamp assembly. The sensor can be, for example, a Geiger counter, a temperature sensor, an audio sensor, or an olfaction sensor. In a second operation 1104, data related to area surrounding the lamp assembly is captured by sensor. In a third operation step 1106, the data is transmitted from the sensor to a processing circuit. In a fourth operation 1108, the data is transmitted from the processing circuit to a base station using a transmit unit. Data from multiple sensors associated with multiple lamp assemblies can be transmitted to a single base station. In an optional fifth operation 1110, the data can be transmitted from the base station to a main station. The data collected by multiple base stations can be transmitted to a single main station. In a sixth operation 1112, the data is analyzed to determine a characteristic of the area surrounding the lamp assembly.

While the lamp monitoring and control unit 310 is generally described as being used with a lamp assembly in the form of a street lamp, in other embodiments, the lamp assembly can be any illumination device for illuminating an outdoor space. For example, in other embodiments, the lamp monitoring and control unit 310 can be used to monitor and control a lamp assembly illuminating a parking lot, a park, an outdoor stadium, or other outdoor sport facility (e.g., basketball courts, tennis courts, etc.).

The foregoing embodiments are merely exemplary and are not to be construed as limiting the present invention. The present teaching can be readily applied to other types of apparatuses. The description of the present invention intended to be illustrative, and not to limit the scope of the claims. Many alternatives, modifications, and variations will be apparent to those skilled in the art.

What is claimed is:

1. A street lamp monitoring system for monitoring at least one street lamp, comprising:
at least one street lamp monitoring device configured to be disposed at a location of the street lamp, the street lamp monitoring device comprising:
a processing circuit,
a transmit circuit, and
an optical sensor configured to collect image data associated with the lamp, wherein the at least one street lamp monitoring device is adapted to wirelessly transmit monitoring data associated with the image collected by the optical sensor, wherein the monitoring data comprises color information and time information or brightness information and the time information such that a characteristic related to life of the street lamp can be determined.

2. The street lamp monitoring system of claim 1, wherein the monitoring data comprises the image data associated with the street lamp.

3. The street lamp monitoring system of claim 1, wherein the at least one monitoring device transmits the monitoring data to at least one station using an RF link.

4. The street lamp monitoring system of claim 1, wherein the optical sensor is disposed above the street lamp.

5. The street lamp monitoring system of claim 1, wherein the at least one street lamp monitoring device comprises a receive circuit.

6. The street lamp monitoring system of claim 1, wherein the optical sensor is mounted on a base, the base configured to move the optical sensor by one of translating the optical sensor along an axis and rotating the optical sensor about an axis.

7. The street lamp monitoring system of claim 5, wherein the optical sensor is moveable to collect the image data associated with the lamp and the image data associated with the area surrounding the lamp.

8. The street lamp monitoring system of claim 1, wherein the optical sensor is a camera that is configured to capture an image in the visible spectrum.

9. The street lamp monitoring system of claim 1, further comprising an additional sensor configured to collect data on the area surrounding the street lamp, the additional sensor being one of a Geiger counter, an olfaction sensor, an acoustic sensor, and a vibration sensor.

10. A street lamp monitoring system, comprising:
at least one street lamp monitoring device configured to be disposed at a location of the street lamp, the street lamp monitoring device comprising:
a processing circuit,
a transmit circuit, and
an optical sensor comprising an array of light sensitive pixels configured to be directed at the street lamp and collect image data associated with the lamp, wherein the at least one lamp monitoring device is adapted to wirelessly transmit monitoring data associated with the image collected by the optical sensor, wherein the monitoring data comprises color information and time information or brightness information and the time information such that a characteristic of the street lamp can be determined, wherein the characteristic is color shift or cycling.

11. The street lamp monitoring system of claim 10, further comprising a remote device configured to receive the monitoring data, the remote device comprising an algorithm configured to detect cycling or color shift.

12. The street lamp monitoring system of claim 10, wherein the monitoring data is compared to a baseline and transmitted when a difference from the baseline is detected.

13. The street lamp monitoring system of claim 12, wherein the baseline is determined a street lamp installation and stored in a memory of the at least one street lamp monitoring device.

14. The street lamp monitoring system of claim 10, wherein the optical sensor is also configured to be directed an environment around the street lamp and the image comprises an image of the environment.

15. The street lamp monitoring system of claim 10, wherein the at least one street lamp monitoring device comprises a receive circuit configured to receive a command from a remote device configured to receive the monitoring data, the remote device comprising an algorithm configured to detect cycling or color shift, wherein the command causes the optical sensor to capture a different view.

16. The street lamp monitoring system of claim 10, wherein the at least one street lamp monitoring device comprises a receive circuit configured to receive a command from a remote device configured to receive the monitoring data, the remote device comprising an algorithm configured to detect cycling or color shift, wherein the command causes the optical sensor to move.

17. The street lamp monitoring system of claim 10, wherein the optical sensor is configured to detect light in the visible and infrared spectrum.

18. The street lamp monitoring system of claim 17, wherein the image data is compared to a baseline and transmitted when a difference from the baseline is detected, and wherein the at least one street lamp monitoring device comprises a receive circuit configured to receive a command from a remote device configured to receive the monitoring data, the remote device comprising an algorithm configured to detect cycling or color shift, wherein the command causes the optical sensor to move.

19. A street lamp monitoring system, comprising:

at least one street lamp monitoring device configured to be disposed at a location of the street lamp, the street lamp monitoring device comprising:

a processing circuit, a transmit circuit, an optical sensor configured to be directed at the street lamp and collect image data associated with the lamp, wherein the at least one lamp monitoring device is adapted to wirelessly transmit the image data associated with an image collected by the optical sensor, wherein the monitoring data comprises color information and time information or brightness information and the time information such that a characteristic of the street lamp can be determined, wherein the characteristic is color shift or cycling; and a remote device configured to receive the monitoring data, the remote device comprising an algorithm configured to detect the cycling or color shift.

20. The street lamp monitoring system of claim 19, wherein the optical sensor is configured to detect light in the visible and infrared spectrum.

* * * * *